United States Patent [19]

Kiryanoff et al.

[11] Patent Number: 5,779,845
[45] Date of Patent: Jul. 14, 1998

[54] THICK VENEERING PROCESS AND PRODUCT

[75] Inventors: John M. Kiryanoff, Jenison, Mich.; Michael A. Hinshaw, Mocksville, N.C.

[73] Assignee: Baker, Knapp & Tubbs, Inc., Grand Rapids, Mich.

[21] Appl. No.: 731,616

[22] Filed: Oct. 16, 1996

[51] Int. Cl.⁶ .................................................. B30B 31/00
[52] U.S. Cl. ............................................................ 156/299
[58] Field of Search ............................................. 156/299

[56] References Cited

U.S. PATENT DOCUMENTS

| | | | |
|---|---|---|---|
| 1,126,292 | 1/1915 | Runne | 156/545 |
| 1,374,931 | 4/1921 | Lewis | 428/535 |
| 1,720,803 | 7/1929 | Sziborr | 156/538 |
| 2,035,761 | 3/1936 | Reese | 428/205 |
| 2,601,349 | 6/1952 | Welch | 156/235 |
| 2,617,321 | 11/1952 | Faussner | 156/538 |
| 2,710,276 | 6/1955 | Mottet et al. | 428/50 |
| 2,782,468 | 2/1957 | Leonardson et al. | 428/106 |
| 3,234,975 | 2/1966 | Brookhyser et al. | 144/2.1 |
| 3,616,127 | 10/1971 | Guenther | 428/106 |
| 3,841,945 | 10/1974 | Troutner et al. | 156/538 |
| 3,907,624 | 9/1975 | Gravely, Jr | 156/214 |
| 4,142,007 | 2/1979 | Lampe et al. | 428/165 |
| 4,743,509 | 5/1988 | Kohrhanek | 428/425.1 |
| 5,169,699 | 12/1992 | Prince | 428/68 |
| 5,277,953 | 1/1994 | Tsuda | 428/53 |
| 5,286,545 | 2/1994 | Simmons, Jr. | 428/192 |
| 5,415,943 | 5/1995 | Groger et al. | 428/537.1 |
| 5,418,034 | 5/1995 | McGuire, III | 428/106 |
| 5,472,767 | 12/1995 | Neubauer | 428/105 |

*Primary Examiner*—Francis J. Lorin
*Attorney, Agent, or Firm*—Merchant, Gould, Smith, Edell, Welter & Schmidt, P.A.

[57] ABSTRACT

A method of making a decorative veneer panel having the appearance of antique, solid, planked, hand-planed wood wherein one-eight inch veneer sheets are adhesively applied to opposite sides of a fiberboard panel, one of the veneer sheets being of high quality wood and preferably including a decorative veneer strip, cutting spaced, parallel, flat bottomed grooves in the sheet of high quality veneer to give the appearance of a plurality of separate boards, and hand planing the raised faces of the veneer sheet and the bottom surfaces of the grooves to achieve a wavy, textured look; and the product resulting from that method.

9 Claims, 3 Drawing Sheets

THICK VENEERING PROCESS AND PRODUCT

FIELD OF THE INVENTION

The present invention relates to a method of making a decorative veneer panel having the appearance of antique, solid, planked, hand-planed wood for use in making furniture and the like and to the resulting laminated product.

BACKGROUND OF THE INVENTION

Because expensive, high quality wood is either not available in quantity or is too expensive, wood veneerlaminates have long been used in making wood panels having a decorative appearance and in making decorative panels used to make furniture. The basic techniques for applying thin veneer sheets to an inexpensive wood core layer are well known in the art. Typically, a thin layer of expensive wood veneer is glued to a thicker core layer of either wood or a wood composition material. Grooves may be cut in the face of the panel for decorative purposes. The grooved plywood paneling shown in the Guenther U.S. Pat. No. 3,616,127 issued Oct. 26, 1971 is an example of a three layer laminate having grooves cut through the face layer into the core material to give the panel the appearance of a plurality of separate boards.

The plywood panel shown in the Guenther Patent would not be useful, however, in making furniture where a flat surface is desired, as for example in making a table top. While it might be desirable to have the appearance of separate boards, it would not be feasible to make a table top having a plurality of grooves unless of course the surface were covered with glass or clear plastic. Further, panels made with known techniques such as those of Guenther do not have a realistic, rustic appearance of the type contemplated by the present invention.

Therefore, although the art of making laminated, decorative wood panels has been highly developed the prior art does not teach a technique for making a decorative, flat panel having the appearance of antique, solid, planked, hand-planed wood, which can be used for making table tops or other furniture parts where a flat surface is desired.

SUMMARY OF THE INVENTION

In accordance with a preferred embodiment of the present invention, relatively thick sheets of decorative wood veneer are adhesively applied to opposing sides of a core layer of wood to create a panel having oppositely facing flat surfaces, a plurality of spaced grooves are cut in an outwardly directed face of one veneer sheet to impart the look of planks of solid wood, and the raised face portions of the veneer sheet between the grooves are hand planed in a direction generally parallel to the grooves until all of the surfaces are generally in the same plane, to achieve a wavy, uneven surface effect thus giving the appearance of alternating wood planks.

In the preferred embodiment, a relatively thick veneer is applied to both the top and the bottom of a core. A veneer which is approximately ⅛" thick rather than the standard ¹⁄₃₂"–¹⁄₄₅" veneers is used, preferably on both layers to balance the core and to stabilize it, but the thicker veneer is used at least on the decorative face layer to provide a sufficient depth of wood veneer for routing and hand-planing. Both the process and the resulting product are unique and permit the construction of high quality, antique looking furniture.

Other features and advantages of the present invention will become apparent to those skilled in the art from the following description wherein there is shown and described a preferred embodiment of the inventionHowever, it should be recognized that the invention can be modified in various ways without departing from the basic concepts. Accordingly, the drawings and descriptions should be regarded as illustrative in nature and not as limiting the scope of the invention.

DETAILED DESCRIPTION OF THE PREFERRED EMBODIMENT

Figure 1:
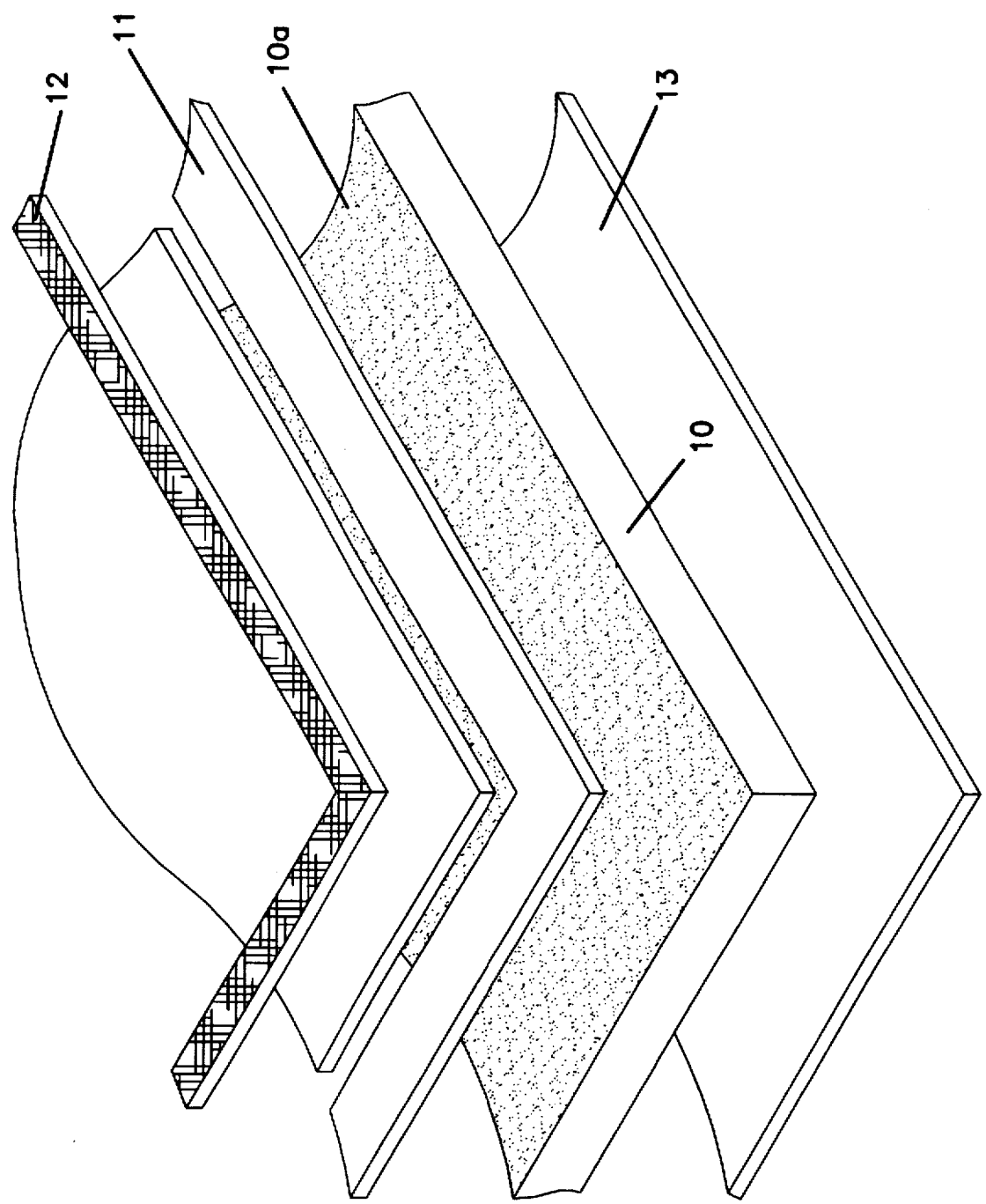
FIG. 1 is a fragmentary, exploded view in perspective of a basic panel constructed according to the initial steps of the process, portions thereof being broken away and portions being shown in section.

Referring now to the drawings, wherein like numerals are used throughout the several views to identify like elements of the invention, there is shown in FIG. 1 the multiple layers of the decorative panel including the core 10, a top veneer layer 11, a decorative veneer strip 12 and a bottom veneer layer 13. The core layer 10 is preferably ⅝" thick and is preferably cut from a flat panel of medium density fiberboard but could be cut or formed from other inexpensive wood such as particle board, plywood, chipboard or solid lumber. In the preferred embodiment of our invention, both sheets of veneer 11 and 13 are ⅛" thick. Veneer layer 11 is preferably ⅛" thick rather than the standard ¹⁄₃₂"–¹⁄₄₅" veneers so that it is thick enough to accept the grooves shown in FIGS. 2 and 3 without exposing the core 10. The top veneer layer 11 is cut from a decorative wood such as walnut or cherry and the rectangular strip 12 is cut from a different decorative wood to provide contrast. Strip 12, or if desired, multiple strips 12, are of the same thickness as layer 11. Although a ⅛" veneer is preferred, some exotic varieties of wood are available only in lesser thickness. In such cases veneers as thin as about ¹⁄₂₄" can be used in the present invention. Bottom veneer layer 13 is constructed from a less expensive variety of wood and is applied to balance the core 10 and thus stabilize it. The fiberboard core 10 could range from ¼" thick up to 3" or so thick, depending upon the final product.

Figure 2:
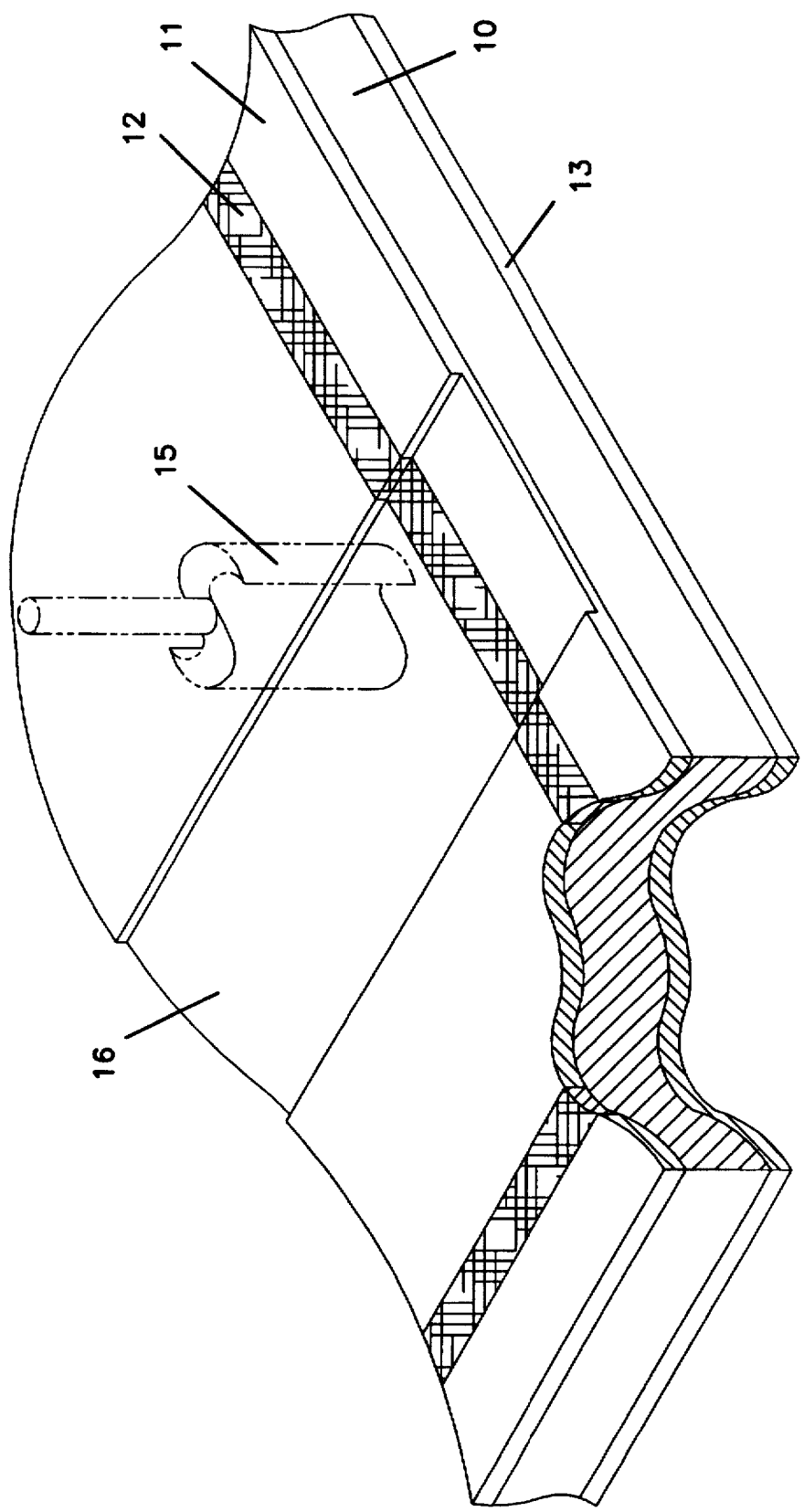
FIG. 2 is a view in perspective of the panel constructed as shown in FIG. 1, with parallel spaced grooves having been cut into the upper veneer surface, a portion thereof being cut away and shown in section.

To assemble the panel, a layer of adhesive 10a is applied to the top surface of core 10 and a similar layer is applied to the bottom surface, and the layers are then pressed together to form a solid, laminated panel as shownin FIG. 2. The panel shown in this preferred embodiment is intended for use as a table top so it would be cut to the correct size before being assembled. Strip 12 thus forms a rectangular decorative strip imbedded in the table top and although not shown in the drawings, decorative edge strips would be applied to the completed panel to cover the edges of the layers.

Figure 3:
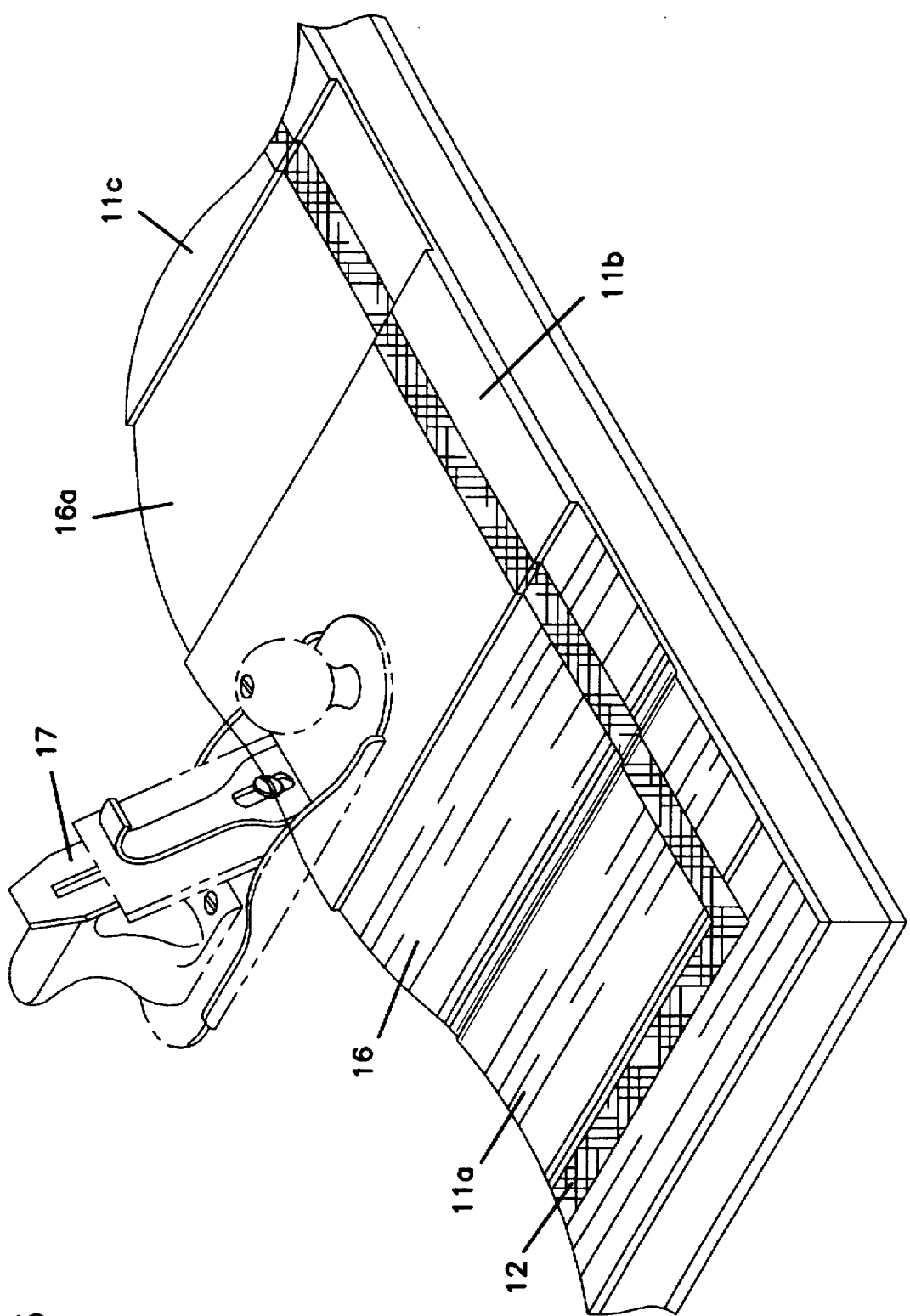
FIG. 3 is a view in perspective of the grooved panel showing the additional step of hand-planing the raised surfaces.

Completion of the steps described above results in a flat, laminated panel, a portion of which is shown in FIG. 2. The next step in constructing the decorative panel is cutting a plurality of spaced grooves in the outwardly directed face of veneer layer 11, 12 to impart the look of alternating planks of solid wood. A router having a bit 15 is used to cut a groove 16 and as shown in FIG. 3 additional grooves such as 16a, which may be of a different width if desired. Router bit 15 has a flat bottom so that it cuts groove 16 to have a flat bottom surface and opposite sides which extend perpendicular to the flat bottom. The opposite sides of the groove are parallel to each other and are preferably parallel to a pair of opposite ends of the rectangular panel. Grooves 16, 16a are preferably cut to the same depth part way through veneer layer 11 and strip 12 so that a decorative wood surface, deep enough to be planed, remains and the core layer 10 is not exposed. As shown in FIG. 3, a plurality of grooves 16, 16a are cut all the way across the table top, either at evenly or randomly spaced intervals with the grooves extending from edge to edge across the top. A router bit is selected so as to provide a smooth bottom surface to each of the grooves. When this step is completed, the decorative panel has a series of parallel grooves extending the full length of the table top, which grooves or cuts alternate with strips of unrouted veneer, imparting the look of planks of solid wood.

In FIG. 3 the same panel is shown, but on a smaller scale to show the location of the next groove 16a. The next step in preparing the panel is to use a hand plane like the plane 17 shown in the drawing to plane all of the faces and bottom groove surfaces of the veneer sheet 11, 12. All of the outwardly facing surfaces of sheet 11, 12 16 are hand-planed in a direction generally parallel to grooves 16, 16a to achieve a wavy, antique looking texture on all of the faces and bottom surfaces. The face 11a shown in FIG. 3 has been planed down to slightly above the level of the bottom surface 16a of groove 16. In like fashion, the faces 11b, 11c will be planed down to the same level and in the same fashion as face 11a. Thus, when the process is completed the surfaces 11a, 11b, 11c shown in FIG. 3 will preferably lie in basically the same plane, with faces 16, 16a, lying in a lightly lower plane. Preferably the two planes are about 1/32" apart and the boundaries are sloped or rounded, as shown in FIG. 3 on planed face 11a, the planed bottom surface of groove 16, and the boundary between them. As a result of this process, a wavy texture is achieved on the planed faces making the piece look antique, like it is made of solid planks which were hand-planed. A look is achieved which would be much more expensive to produce with solid wood.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of making a decorative panel having the appearance of antique, solid, planked, hand-planed wood, using a hand plane comprising the steps of:

(a) Adhesively applying relatively thick sheets of veneer to opposing sides of a core layer of wood material to create a panel;

(b) Cutting a plurality of spaced grooves, each having a bottom surface of sufficient width to accommodate a hand plane, in an outwardly directed face of one of said veneer sheets to create alternating faces and bottom surfaces, to impart the look of planks of solid wood; and (c) Hand planing the faces and bottom surfaces of said one veneer sheet in a direction generally parallel to said grooves, to achieve a wavy, antique looking texture.

2. The method of claim 1 wherein the core layer is about one-half inch thick, the grooved veneer sheet is about one-eighth inch thick, and wherein each said groove is cut part way through the veneer sheet.

3. The method of claim 1 wherein said grooves are cut parallel to each other with each groove being shaped to have a flat bottom surface and wherein the spaced faces between the grooves are planed down to a level slightly above the planed bottom surfaces of said grooves.

4. A decorative panel constructed according to the method of claim 1.

5. A decorative panel according to claim 4 wherein the core layer is a wood material thicker than the veneer, the grooved veneer sheet is about one-eighth thick, and wherein each said groove is cut part way through the veneer sheet.

6. A decorative panel according to claim 4 wherein said grooves are cut parallel to each other with each groove being shaped to have a flat bottom surface and wherein the spaced faces between the grooves are planed down to a level slightly above the bottom surfaces of said grooves.

7. A method of making a decorative panel, comprising the steps of:

(a) Adhesively applying a first sheet of wood veneer approximately 1/24" to 1/8" thick to one side of a thicker core layer of wood material and a second sheet of wood veneer to an opposite side of said core layer to create a panel having oppositely directed faces;

(b) Cutting a plurality of spaced grooves in the an outwardly directed face of said first veneer sheet, with each groove being shaped to have a bottom surface, to impart to the resulting faces and bottom surfaces the look of planks of solid wood; and (c) Hand-planing the faces and bottom surfaces of said first veneer sheet in a direction generally parallel to said grooves to achieve a wavy, antique looking texture.

8. A decorative panel constructed according to the method of claim 7.

9. A decorative panel according to claim 8 wherein the faces between said grooves are planed down to a level slightly above the bottom surfaces so as to provide a sloping boundary between the faces and bottom surfaces.

\* \* \* \* \*